Figure 1:
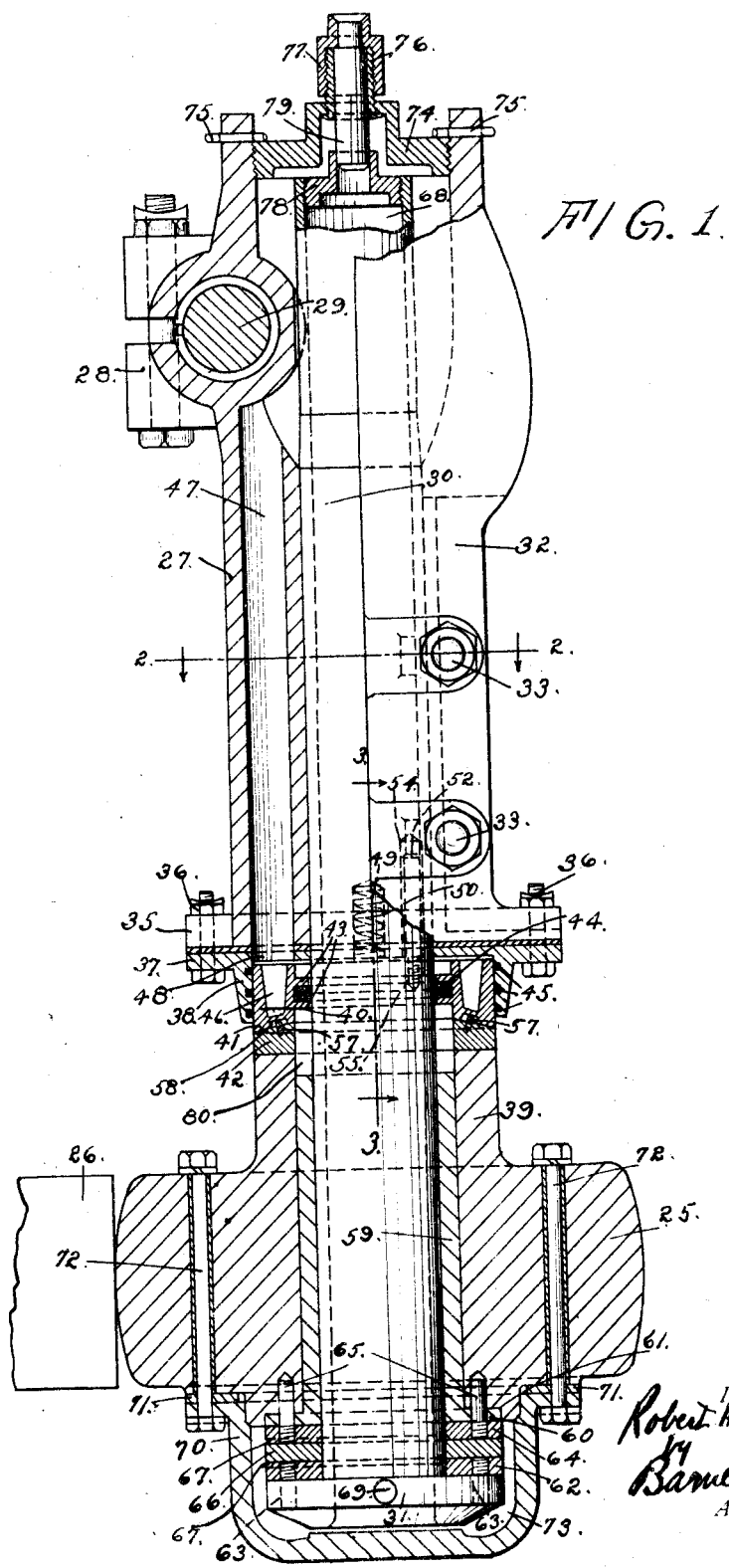

R. A. LACHMANN.
BEARING FOR PULVERIZER MILL ROLLERS.
APPLICATION FILED DEC. 7, 1915.

1,198,856.

Patented Sept. 19, 1916.
2 SHEETS—SHEET 1.

INVENTOR.
Robert A Lachmann
Barnett Truman
ATTORNEYS.

R. A. LACHMANN.
BEARING FOR PULVERIZER MILL ROLLERS.
APPLICATION FILED DEC. 7, 1915.
1,198,856.
Patented Sept. 19, 1916.
2 SHEETS—SHEET 2.
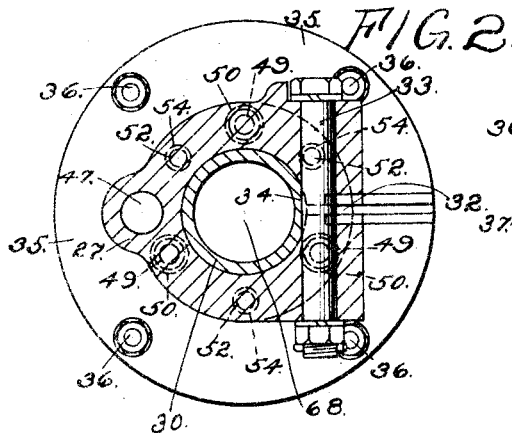
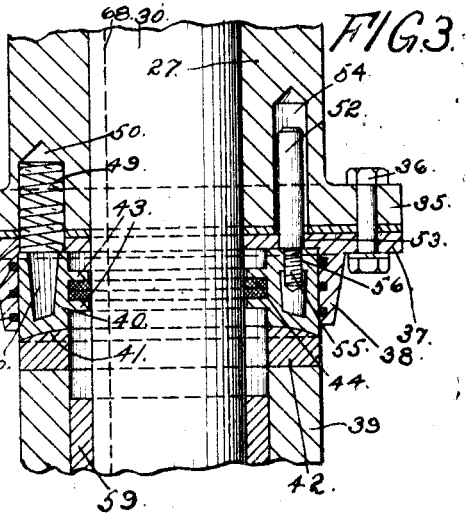
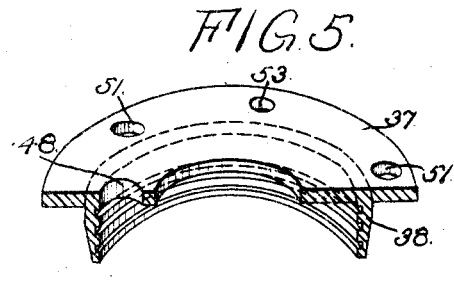
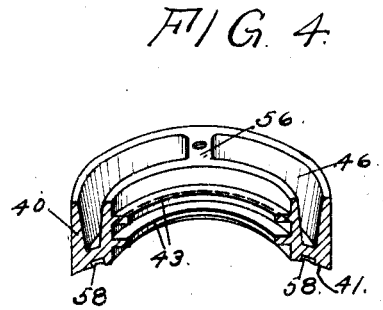
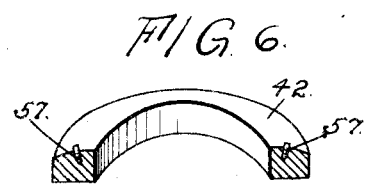
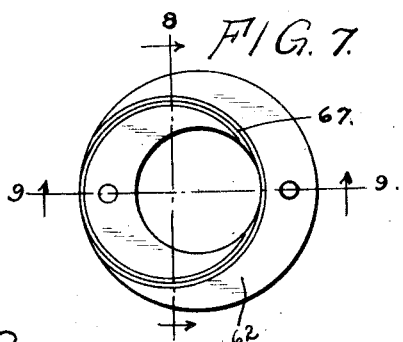
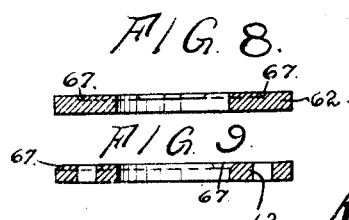
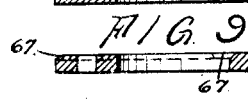
INVENTOR.
Robert A. Lachmann
BY Barnes + Truman
ATTORNEYS

UNITED STATES PATENT OFFICE.

ROBERT A. LACHMANN, OF CHICAGO, ILLINOIS, ASSIGNOR TO RAYMOND BROTHERS IMPACT PULVERIZER COMPANY, OF CHICAGO, ILLINOIS, A CORPORATION OF ILLINOIS.

BEARING FOR PULVERIZER-MILL ROLLERS.

1,198,856.                    Specification of Letters Patent.      Patented Sept. 19, 1916.

Original application filed May 10, 1915, Serial No. 27,104. Divided and this application filed December 7, 1915. Serial No. 65,150.

*To all whom it may concern:*

Be it known that I, ROBERT A. LACHMANN, a citizen of the United States, residing at Chicago, in the county of Cook and State of Illinois, have invented certain new and useful Improvements in Bearings for Pulverizer-Mill Rollers, of which the following is a specification.

My invention relates to pulverizing mills of the type employing rollers which operate by centrifugal force against a circular member called the bull ring, and the primary object of the invention is to provide certain improvements in the structure which supports and affords a bearing for a roller in a mill of this type, which improvements relate particularly to the lubrication of the bearing surfaces and the exclusion therefrom of dust, grit, and the like. In a mill of this sort the rollers are suspended in the pulverizing chamber so as to be exposed to the finely divided material in the form of dust, grit or powder which can only be kept out of the bearings of the rollers by providing a constant flow of lubricant along all of the bearings surfaces. It is desirable, for reasons of economy and for other obvious reasons, that there should be no waste of the lubricant. Just enough should be supplied to the bearing surfaces to keep them properly lubricated and to maintain proper lubrication and keep out foreign matter. My invention provides a construction for accomplishing this result.

A further object is to provide a lubricating system for a roller bearing of the type described which will permit the use of a relatively thin, light oil instead of the usual grease. Oil is more desirable in this connection because of its greater lubricating value and its freedom from the foreign matters or fillers which form an ingredient of greases which are, to a certain extent, injurious to the bearing surfaces.

A further object is to provide a bearing structure for the roller of a pulverizing mill which will accommodate itself to a slight bending or straining of the shaft on which the roller turns likely to occur on account of the thrust of the roller against the bull ring.

The invention has for further objects such other new and improved constructions, arrangements and devices relating to roller bearings for pulverizing mills, or the like, as will be hereinafter described and claimed.

This application is a division of my application Serial No. 27,104, filed May 10, 1915.

The invention is illustrated, in a preferred embodiment, in the accompanying drawings wherein—

Figure 1 is a longitudinal section, with certain parts in elevation, of a roller and bearing structure on which the same is mounted, a portion of the bull ring against which the roller bears being shown. Fig. 2 is a sectional plan on line 2—2 of Fig. 1. Fig. 3 is a longitudinal section on line 3—3 of Fig. 1. Fig. 4 is a sectional perspective of the upper member of the bearing element which is interposed between the housing and the roller. Fig. 5 is a similar view of the lower member of the housing. Fig. 6 is a similar view of the lower member of the bearing element. Fig. 7 is a plan view of one of the thrust rings arranged between the roller and the head of the shaft on which the roller is mounted, and Figs. 8 and 9 are sectional views on lines 8—8 and 9—9 respectively, of Fig. 7.

Like characters of reference designate like parts in the several figures of the drawings.

Referring to the drawings, 25 is the roller, 26 the bull ring, 27 a housing provided with a clamp 28 by means of which the housing is secured rigidly to a rocking shaft 29. The latter is supported within the pulverizing chamber of the mill in the usual manner.

30 is a shaft formed at the lower end with a head 31 on which roller 25 is supported. The housing is formed with a longitudinal slot 32 and the slotted side with the transverse perforations for the clamping bolts 33 for securing the shaft in the housing. Preferably the bolts 33 engage grooves 34 cut in the shaft 30 (Fig. 2). The housing is formed at the bottom with a flange 35 to which is attached by bolts 36 an annular member 37 having a depending flange 38. Interposed between the housing and the hub 39 of roller 25 is an annular bearing element consisting preferably of a ring 40, the under surface 41 of which is concave, and a ring 42, the upper surface of which is correspondingly convex. The ring 40 lies within the flange 38 of the lower casing member 37 and is formed with interior ribs 43 between which are interposed gaskets or packing rings 44 which bear against the shaft 30. The bearing surface of flange 38 is preferably provided with packing rings 45. The ring 40 is formed with a lubricant channel 46 which is supplied with lubricant from a duct 47 in the housing, the latter communicating with the channel 46 through an opening 48 in the housing member 37. The annular bearing element 40, 42, is pressed against the hub of the roller by suitable elastic means, for example, by coiled springs 49 arranged in recesses 50 in the housing and extending through registering openings 51 in the annular member 37. The ring 40 is preferably held from rotation by guide pins 52 which extend through openings 53 in the annular member 37 and into recesses 54 in the housing 27, the pins having threaded extremities 55 engaging webs 56 on the ring 40 (Fig. 4). The lower ring 42 is preferably, though perhaps not necessarily, engaged with the upper ring 40 in such manner as to hold the lower ring from rotation while permitting a certain lateral shift between the rings in case the shaft 30 bends under the thrust of the roller against the bull ring. To this end the lower ring is provided with studs 57 which enter slots 58 in the upper ring. The lower ring has been described as bearing upon the hub 39 of the roller. It is obvious that, if desired, thrust rings might be interposed between these parts. The roller 25 is preferably provided with a bushing 59 having a flange 60 fitting into a recess 61 on the under side of the roller. Interposed between the flange of the bushing and the head 31 of shaft 30 are a plurality of thrust rings, preferably three in number. The lower ring 62 is secured by studs 63 to the head. The upper ring 64 is secured by similar studs 65 to the body of the roller, the studs passing through the flange 60 of the bushing so as to hold the latter in position on the roller. The intermediate ring 66 has a floating relation with respect to the other rings and preferably one or more of the rings are formed on their bearing surfaces with eccentric grooves 67 which touch the inner and outer circumferences of the rings providing positive means for forcing the lubricant between said rings to the bearing surfaces of the bushing and shaft. The shaft 30 is hollow so as to provide a lubricant duct 68 which extends lengthwise therethrough. The head of the shaft is formed preferably with radial branch ducts 69. The end of the shaft and thrust rings are inclosed by a cap 70 which is secured to the roller, preferably with the interposition of a gasket 71 by bolt 72. The cap provides a closed lubricating space 73 around the thrust rings.

The upper end of the housing is closed by a bonnet 74 held in place by a cotter pin 75 and provided with a threaded nipple 76 for a cap 77. The upper end of shaft 30 is provided with a plug 78 having an opening therein into which fits a valve 79 secured to the cap 77.

Operation: The housing, it will be understood, is suspended by means of the trunnion shaft 29 so that the roller 25 bears against the bull ring 26. The roller and its supporting structure is given a movement of rotation within the mill which causes the roller to bear against and move around the interior of the bull ring revolving on shaft 30 as an axis. When oil is used as a lubricant, which is desirable for the reasons above stated and is feasible because of the peculiar construction of the device of my invention, the lubricating ducts 47, 68 may be filled by removing cap 77. If a heavy grease is employed it will ordinarily be necessary to remove the bonnet 74 and plug 78. The lubricant duct 47 supplies lubricant to the bearing surfaces between the flange 38 of the lower housing member 37 and the upper member 40 of the annular bearing element which is interposed between the housing and the roller. The bearing element is held from rotation by guide pins 52 but in such a way as to permit vertical movement to take up wear. The bearing element is kept closely pressed against the hub of the roller by springs 49. By making the bearing element in two parts, 40, 42, with co-engaging concave and convex surfaces, a certain amount of lateral displacement is possible to accommodate for a slight bending of the shaft 30 due to thrust of the roller against the bull ring. The lubricant in duct 68 in shaft 30 is forced by its head and by capillary attraction into the lubricant chamber 73 and between the thrust rings 62, 64, 66 to the bearing surfaces between the shaft 30 and the bushing 59, and thence it passes up along these bearing surfaces to the space 80 above the bushing 59, enough of it passing out between the rings 40, 42 and between the latter ring and the hub of the roller to prevent foreign matter from working into the bearing at these places. The packing rings 44 prevent the lubricant from working up between the roller and the housing.

While I have described my invention in a preferred embodiment, I believe the same to be susceptible of certain modifications without departure from the principles of the invention. Therefore I do not wish to be understood as intending to limit the invention to the particular constructions, arrangements and devices shown and described except so far as the claims are specifically so limited.

By the terms "substantially upright" as describing the position of the housing, I do not wish to exclude a position which is a trifle oblique to the vertical. In certain pulverizing mills of this type the axes of the rollers are not strictly speaking vertical but are a trifle inclined.

I claim:

1. In apparatus of the character described, the combination of a shaft, a housing adapted to support the shaft in substantially upright position, a roller revolubly supported on the lower end of the shaft, and an annular bearing element interposed between the housing and the roller; said shaft being formed with a lubricant duct to supply lubricant to the bearing surfaces of the roller and shaft, and the housing with a duct to supply lubricant to said bearing element.

2. In apparatus of the character described, the combination of a shaft, a housing adapted to support the shaft in substantially upright position, a roller revolubly supported on the lower end of the shaft, an annular bearing element interposed between the housing and the roller, and elastic means operating to thrust said bearing element against the roller; said shaft being formed with a lubricant duct to supply lubricant to the bearing surfaces of the roller and shaft, and the housing with a duct to supply lubricant to said bearing element.

3. In apparatus of the character described, the combination of a shaft, a housing adapted to support the shaft in substantially upright position, a roller revolubly supported on the lower end of the shaft, an annular bearing element interposed between the housing and the roller, elastic means operating to thrust said bearing element against the roller, and guide pins engaging said bearing element and housing; said shaft being formed with a lubricant duct to supply lubricant to the bearing surfaces of the roller and shaft, and the housing with a duct to supply lubricant to said bearing element.

4. In apparatus of the character described, the combination of a shaft, a housing adapted to support the shaft in substantially upright position, a roller revolubly supported on the lower end of the shaft, an annular bearing element partially inclosed by said housing and interposed between the housing and the roller; said shaft being formed with a lubricant duct to supply lubricant to the bearing surfaces of the roller and shaft, and the housing with a duct to supply lubricant to said bearing element.

5. In apparatus of the character described, the combination of a shaft, a housing adapted to support the shaft in substantially upright position, a roller revolubly supported on the lower end of the shaft, an annular bearing element interposed between the housing and roller and formed with a lubricating groove on its upper surface; said shaft being formed with a lubricant duct to supply lubricant to the bearing surfaces of the roller and shaft, and the housing with a duct to supply lubricant to said bearing element.

6. In apparatus of the character described, the combination of a shaft, a housing adapted to support the shaft in substantially upright position, a roller revolubly supported on the lower end of the shaft, an annular bearing element introduced between the housing and the roller and provided on its inner surface with a packing ring which bears against said shaft; said shaft being formed with a lubricant duct to supply lubricant to the bearing surfaces of the roller and shaft and the housing, with a duct to supply lubricant to said bearing element.

7. In apparatus of the character described, the combination of a shaft, a housing adapted to support the shaft in substantially upright position, a roller revolubly supported on the lower end of the shaft, an annular bearing element interposed between the housing and the roller comprising a pair of rings arranged one above the other and having concave and convex engaging surfaces; said shaft being formed with a lubricant duct to supply lubricant to the bearing surfaces of the roller and shaft and the housing with a duct to supply lubricant to said bearing element.

8. In apparatus of the character described, the combination of a shaft, a housing adapted to support the shaft in substantially upright position, a roller revolubly supported on the lower end of the shaft, an annular bearing element interposed between the housing and roller comprising a pair of rings one arranged above the other having concave and convex engaging surfaces, and means for preventing rotation between said rings while permitting angular displacement of one with respect to the other.

9. In apparatus of the character described, the combination of a shaft, a housing adapted to support the shaft in substantially upright position, a roller revolubly supported on the lower end of the shaft, an annular bearing element interposed between the housing and the roller, and means providing a lubricant space around the lower end of the shaft; said shaft being formed with a lubricant duct to supply lubricant to the bearing surfaces of the roller and shaft and the housing with a duct to supply lubricant to said bearing element.

10. In apparatus of the character described, the combination of a shaft, a housing adapted to support the shaft in substantially upright position, a roller revolubly supported on the lower end of the shaft, an annular bearing element interposed between the housing and roller, a head on the lower end of the shaft, thrust rings interposed between the roller and head, a cap providing a lubricant chamber around said thrust rings; said shaft being formed with a lubricant duct extending therethrough and communicating with said lubricant chamber, and the housing with a lubricant duct to supply a lubricant to said bearing element.

11. In apparatus of the character described, the combination of a shaft, a housing adapted to support the shaft in substantially upright position, a roller revolubly supported on the lower end of the shaft, an annular bearing element interposed between the housing and roller, a head on the lower end of the shaft, thrust rings interposed between the roller and head, a cap providing a lubricant chamber around said thrust rings, a packing ring intervening between said bearing element and shaft; said shaft being formed with a lubricant duct extending therethrough and communicating with said lubricant chamber and the housing with a lubricant duct to supply a lubricant to said bearing element.

12. In apparatus of the character described, the combination of a shaft, a housing adapted to support the shaft in substantially upright position, a roller revolubly supported on the lower end of the shaft, an annular bearing element interposed between the housing and roller, a head on the lower end of the shaft, thrust rings interposed between the roller and head, a cap providing a lubricant chamber around said thrust rings, springs which thrust said bearing element against the roller, and means for preventing rotation between said bearing element and the housing; said shaft being formed with a lubricant duct extending therethrough and communicating with said lubricant chamber and the housing with a lubricant duct to supply a lubricant to said bearing element.

13. In apparatus of the character described, the combination of a shaft, a housing adapted to support the shaft in substantially upright position, a roller revolubly supported on the lower end of the shaft, an annular bearing element interposed between the housing and roller, a head on the lower end of the shaft, thrust rings interposed between the roller and head, a cap providing a lubricant chamber around said thrust rings, springs which thrust said bearing element against the roller, and means for preventing rotation between said bearing element and the housing; said shaft being formed with a lubricant duct extending therethrough and communicating with said lubricant chamber and the housing with a lubricant duct to supply a lubricant to said bearing element.

14. In apparatus of the character described, the combination of a shaft, a housing adapted to support the shaft in substantially upright position, a roller revolubly supported on the lower end of the shaft, an annular bearing element interposed between the housing and roller comprising two rings arranged one above the other with concave and convex engaging surfaces, a head on the lower end of the shaft, thrust rings interposed between the roller and head, a cap providing a lubricant chamber around said thrust rings, springs which thrust said bearing element against the roller, and means for preventing rotation between said bearing element and the housing; said shaft being formed with a lubricant duct extending therethrough and communicating with said lubricant chamber and the housing with a lubricant duct to supply a lubricant to said bearing element.

15. In apparatus of the character described, the combination of a shaft, a housing adapted to support the shaft in substantially upright position, a roller revolubly supported on the lower end of the shaft, and an annular bearing element interposed between the housing and the roller; said shaft being formed with a lubricant duct to supply lubricant to the bearing surfaces of the roller and shaft and the housing with a duct to supply lubricant to said bearing element, said housing being formed with a depending flange which bears against the outer surface of said bearing element.

16. In apparatus of the character described, the combination of a shaft formed with a lubricant duct extending therethrough, a housing adapted to support said shaft in upright position and provided with a lubricant chamber in the top through which the upper end of the shaft extends and with a lubricant duct extending downwardly through said housing, a roller revolubly supported on the lower end of the shaft, an annular bearing element interposed between the housing and the roller and adapted to be supplied with lubricant by the duct in said housing, and means providing a lubricant chamber at the lower end of said shaft with which the lubricant duct in said shaft communicates.

17. In apparatus of the character described, the combination of a shaft formed with a lubricant duct extending therethrough, a housing adapted to support said shaft in upright position and provided with a lubricant chamber in the top through which the upper end of the shaft extends and with a lubricant duct extending downwardly through said housing, a roller revolubly supported on the lower end of the shaft, an annular bearing element interposed between the housing and the roller and adapted to be supplied with lubricant by the duct in said housing, means providing a lubricant chamber at the lower end of said shaft with which the lubricant duct in said shaft communicates, and a closure for the upper end of the housing adapted to close the lubricant duct in said shaft.

18. In apparatus of the character described, the combination of a shaft formed with a lubricant duct extending therethrough, a housing adapted to support said shaft in upright position and provided with a lubricant chamber in the top through which the upper end of the shaft extends and with a lubricant duct extending downwardly through said housing, a roller revolubly supported on the lower end of the shaft, an annular bearing element interposed between the housing and the roller and adapted to be supplied with lubricant by the duct in said housing, means providing a lubricant chamber at the lower end of said shaft with which the lubricant duct in said shaft communicates, a head on the lower end of the shaft, and thrust rings interposed between the roller and said head.

19. In apparatus of the character described, the combination of a shaft, a housing adapted to support the shaft in substantially upright position, a roller revolubly supported on the lower end of the shaft, an annular bearing element interposed between the housing and the roller comprising a pair of rings arranged one above the other and having concave and convex engaging surfaces, and springs in said housing which thrust said bearing element against said roller; said shaft being formed with a lubricant duct to supply lubricant to the bearing surfaces of the roller and shaft and the housing with a duct to supply lubricant to said bearing element.

20. In apparatus of the character described, the combination of a shaft, a housing adapted to support the shaft in substantially upright position, a roller revolubly supported on the lower end of the shaft, an annular bearing element interposed between and bearing upon the housing and roller; said structure provided with lubricant ducts to supply lubricant to the bearing surfaces of the shaft and roller bearing element and housing.

21. In apparatus of the character described, the combination of a shaft, a housing adapted to support the shaft in substantially upright position, a roller revolubly supported on the lower end of the shaft, an annular bearing element interposed between and bearing upon the housing and roller, and elastic means which thrusts said bearing element against said roller; said structure provided with lubricant ducts to supply lubricant to the bearing surfaces of the shaft and roller bearing element and housing.

22. In apparatus of the character described, the combination of a shaft, a housing adapted to support the shaft in substantially upright position, a roller revolubly supported on the lower end of the shaft, an annular bearing element interposed between and bearing upon the housing and roller movable longitudinally of but non-rotatable with respect to the housing, and elastic means which thrusts said bearing element against said roller; said structure provided with lubricant ducts to supply lubricant to the bearing surfaces of the shaft and roller bearing element and housing.

23. In apparatus of the character described, the combination of a shaft, a housing adapted to support the shaft in substantially upright position, a roller revolubly supported on the lower end of the shaft, an annular bearing element partially inclosed by said housing and interposed between and bearing upon the housing and the roller; said structure being formed with lubricant ducts for supplying lubricant to the bearing surfaces of said shaft, roller bearing element and housing.

24. In apparatus of the character described, the combination of a shaft, a housing adapted to support the shaft in substantially upright position, a roller revolubly supported on the lower end of the shaft, an annular bearing element interposed between and bearing upon the housing and roller and formed with a lubricating groove on its upper surface; said structure being formed with lubricating ducts adapted to supply lubricant to the bearing surfaces of the shaft, roller, bearing element and housing.

25. In apparatus of the character described, the combination of a shaft, a housing adapted to support the shaft in substantially upright position, a roller revolubly supported on the lower end of the shaft, an annular bearing element interposed between and bearing upon the housing and the roller and provided on its inner surface with a packing ring which bears against said shaft; said structure being formed with lubricating ducts adapted to supply lubricant to the bearing surfaces of the shaft, roller, bearing element and housing.

26. In apparatus of the character described, the combination of a shaft, a housing adapted to support the shaft in substantially upright position, a roller revolubly supported on the lower end of the shaft, an annular bearing element interposed between and bearing upon the housing and the roller, and means providing a lubricant space around the lower end of the shaft; said structure being formed with lubricant ducts to supply lubricant to said bearing element and to said lubricant space.

27. In apparatus of the character described, the combination of a housing provided with a depending flange, a shaft supported in said housing in substantially upright position and formed with a head on its lower end, a roller revolubly mounted on the lower end of the shaft supported by said head, an annular bearing element comprising an upper ring arranged within and bearing upon the depending flange of the housing, and a lower ring interposed between said upper ring and said roller, springs adapted to bear upon said upper ring, thrust rings interposed between the roller and the head of the shaft, and a cap surrounding the head and thrust rings providing a lubricant chamber; said shaft being formed with a lubricant duct extending therethrough and the housing with a lubricant duct to supply lubricant to the bearing surfaces of said upper ring and the flange of the housing surrounding the same.

28. In apparatus of the character described, the combination of a shaft, a housing adapted to support the shaft in substantially upright position, a roller revolubly supported on the lower end of the shaft, and a bearing element interposed between the housing and the roller; said shaft being formed with a lubricant duct to supply the bearing surfaces of the roller and shaft, and the housing with a duct to supply lubricant to said bearing element.

29. In apparatus of the character described, the combination of a shaft, a housing adapted to support the shaft in substantially upright position, a roller revolubly supported on the lower end of the shaft, an annular bearing element interposed between said housing and roller, adapted to assume an angular position with respect to said housing, and elastic means which thrusts said bearing element against said roller; said structure being provided with lubricant ducts to supply lubricant to the bearing surfaces of the shaft and roller bearing element and housing.

30. In apparatus of the character described, the combination of a shaft, a housing adapted to support the shaft, a roller on said shaft, a bearing element interposed between the housing and roller; said structure being provided with lubricant ducts to supply lubricant to the shaft and bearing element.

31. In apparatus of the character described, the combination of a shaft, a housing adapted to support the shaft, a roller on said shaft, a bearing element interposed between and bearing upon the housing and roller, said structure being provided with lubricant ducts to supply lubricant to the shaft and bearing element.

32. In apparatus of the character described, the combination with a shaft, a housing adapted to support the shaft in substantially upright position, a roller on said shaft, a bearing element interposed between the housing and roller, said structure being provided with lubricant ducts to supply lubricant to the shaft and bearing element.

33. In apparatus of the character described, the combination with a housing provided with a lubricant chamber, a shaft supported in the housing, a roller on the lower end of the shaft, a bearing element interposed between and bearing upon the housing and roller and formed with a channel communicating with the lubricant chamber, and means for providing a lubricant space at the lower end of the shaft adapted to supply lubricant to the bearing surfaces of said roller.

34. In apparatus of the character described, the combination with a housing provided with a lubricant chamber, a shaft supported in the housing, a roller on the lower end of the shaft, a bearing element interposed between and bearing upon the housing and roller and formed with a channel communicating with the lubricant chamber, means for providing a lubricant space at the lower end of the shaft adapted to supply lubricant to the bearing surfaces of said roller, and means for preventing the passage of lubricant from said lubricant space beyond said bearing member.

35. In apparatus of the character described, the combination with a housing provided with a lubricant chamber, a shaft supported in the housing, a roller on the lower end of the shaft, a bearing element interposed between and bearing upon the housing and roller and formed with a channel communicating with the lubricant chamber, means for providing a lubricant space at the lower end of the shaft adapted to supply lubricant to the bearing surfaces of said roller, and means carried by the bearing member to prevent the passage of lubricant from said lubricant space beyond said bearing member.

36. In apparatus of the character described, the combination with a housing provided with a lubricant chamber, a shaft supported in said housing, a roller on the lower end of said shaft, a bearing member interposed between and bearing upon the housing and roller, said apparatus being provided with lubricant ducts to supply lubricant to the bearing surfaces of said roller and bearing member, and means for providing a closure for the inlet ends of said ducts.

37. In apparatus of the character described, the combination of a shaft, a housing adapted to support the shaft in substantially upright position, a roller revolubly supported on the lower end of the shaft, a bearing element interposed between and bearing upon the housing and said roller, said housing being formed with a lubricant chamber and duct for supplying lubricant to said bearing element, and a shaft with a duct to supply lubricant to the roller and shaft, and means for providing a closure for said ducts, comprising a plug screwed into the upper end of said chamber, and means projecting through said plug to close the duct in said shaft.

38. In apparatus of the character described, the combination of a shaft, a housing adapted to support the shaft in substantially upright position, a roller revolubly supported on the lower end of the shaft, a bearing element interposed between and bearing upon the housing and said roller, said housing being formed with a lubricant chamber and duct for supplying lubricant to said bearing element, said shaft being provided with a duct to supply lubricant to the roller and shaft, a plug secured in the duct in said shaft and provided with an aperture and removable means carried by said first-named plug, adapted to extend into said aperture.

ROBERT A. LACHMANN.